(12) United States Patent
Archer

(10) Patent No.: US 11,536,308 B2
(45) Date of Patent: Dec. 27, 2022

(54) ADJUSTABLE FASTENER SYSTEM

(71) Applicant: Arrowhead Design and Innovation, LLC, Chester, NH (US)

(72) Inventor: Timothy Edward Archer, Chester, NH (US)

(73) Assignee: ARROWHEAD DESIGN AND INNOVATION, LLC, Chester, NH (US)

( * ) Notice: Subject to any disclaimer, the term of this patent is extended or adjusted under 35 U.S.C. 154(b) by 457 days.

(21) Appl. No.: 16/701,075

(22) Filed: Dec. 2, 2019

(65) Prior Publication Data

US 2020/0173480 A1 Jun. 4, 2020

Related U.S. Application Data

(60) Provisional application No. 62/774,773, filed on Dec. 3, 2018.

(51) Int. Cl.
*F16B 13/06* (2006.01)

(52) U.S. Cl.
CPC .......... *F16B 13/065* (2013.01); *F16B 13/06* (2013.01)

(58) Field of Classification Search
CPC .... F16B 13/004; F16B 13/065; F16B 13/066; F16B 13/0858; F16B 13/122; F16B 13/124; F16B 13/128; F16B 13/06
USPC ............................ 411/44, 54, 55, 80.5–80.6
See application file for complete search history.

(56) References Cited

U.S. PATENT DOCUMENTS

| | | | |
|---|---|---|---|
| 2,672,659 A | | 5/1950 | Becker |
| 3,897,713 A | | 8/1975 | Gugle |
| 4,033,223 A | | 7/1977 | Marks |
| 4,094,222 A | | 6/1978 | Lang et al. |
| 4,470,174 A | | 9/1984 | Rhea |
| 4,505,008 A | | 3/1985 | Yoshikawa |
| 4,519,735 A | * | 5/1985 | Machtle ................ F16B 13/066 411/65 |
| 4,661,030 A | | 4/1987 | Delmastro |
| 4,662,807 A | | 5/1987 | Lien et al. |
| 4,681,496 A | | 7/1987 | Fasolino |
| 4,904,134 A | * | 2/1990 | Fischer ............... F16B 13/0858 411/60.1 |
| 4,916,779 A | | 4/1990 | Terada et al. |
| 5,042,888 A | * | 8/1991 | Shinjo ................... F16B 13/065 411/54 |

(Continued)

*Primary Examiner* — Roberta S Delisle
(74) *Attorney, Agent, or Firm* — Grossman, Tucker, Perreault & Pfleger, PLLC

(57) ABSTRACT

An adjustable fastener system generally includes an anchor component, a drive component, and a finish head component. The finish head component is threaded onto the anchor component to form the completed fastener that may be adjusted to different heights. The drive component is used to drive the anchor component into position prior to adjusting the finish head component. In some embodiments, the drive component may be used before the finish head component is installed, and in other embodiments, the drive component may be used with the finish head component installed. The adjustable fastener system saves time and effort at a construction site, eliminates the amount of prep work, and eliminates the need to have multiple different fasteners on site. The adjustable fastener system may be used for installing insulation panels over concrete in a roofing system as well as other applications.

20 Claims, 5 Drawing Sheets

(56) References Cited

U.S. PATENT DOCUMENTS

| | | | |
|---|---|---|---|
| 5,054,983 | A | 10/1991 | Froewis et al. |
| 5,082,399 | A | 1/1992 | Frease et al. |
| 5,177,922 | A | 1/1993 | Ovaert et al. |
| 5,215,030 | A | 6/1993 | Conti |
| 5,256,016 | A * | 10/1993 | Godfrey ............... F16B 13/065 411/57.1 |
| 5,332,346 | A | 7/1994 | Shinjo |
| 5,415,509 | A | 5/1995 | Martin et al. |
| 5,426,905 | A | 6/1995 | Rollhauser et al. |
| 5,450,660 | A | 9/1995 | Frano |
| 5,630,257 | A | 5/1997 | Brody et al. |
| 5,636,891 | A | 6/1997 | Van Order et al. |
| 6,683,285 | B2 | 1/2004 | Wyss et al. |
| 6,695,396 | B1 | 2/2004 | Schwab et al. |
| 6,835,036 | B2 | 12/2004 | Paul |
| D631,312 | S | 1/2011 | Wallimann-Durrer et al. |
| D648,606 | S | 11/2011 | Sallander |
| 8,162,578 | B2 | 4/2012 | Dai |
| 8,807,502 | B2 | 8/2014 | Bixler |
| 8,899,541 | B2 | 12/2014 | Bixler et al. |
| 8,948,577 | B2 | 2/2015 | Eberli et al. |
| 8,950,152 | B2 | 2/2015 | Milkiewicz |
| 9,003,633 | B1 | 4/2015 | Difante |
| 9,394,706 | B2 | 7/2016 | Lin |
| D771,454 | S | 11/2016 | Steinel |
| 9,669,770 | B1 | 6/2017 | Schlaupitz et al. |
| 10,047,517 | B2 | 8/2018 | Espinosa |
| 10,070,740 | B2 | 9/2018 | Jacobs |
| 2008/0050195 | A1 * | 2/2008 | Wieser ............... F16B 13/065 411/44 |
| 2010/0008655 | A1 | 1/2010 | Tackitt et al. |
| 2012/0263553 | A1 * | 10/2012 | Greenfield ............ F16B 5/0275 411/55 |

* cited by examiner

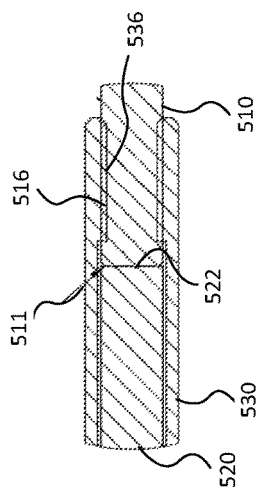
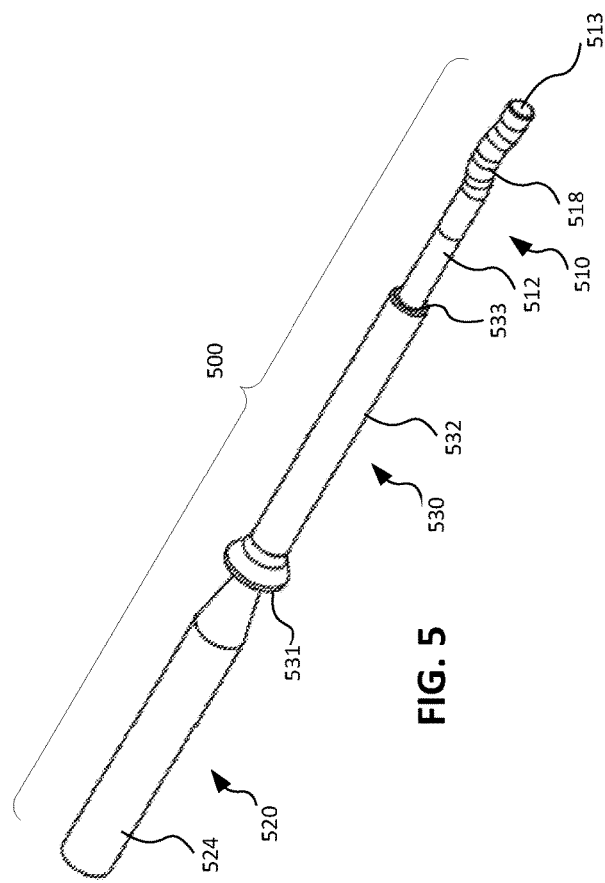
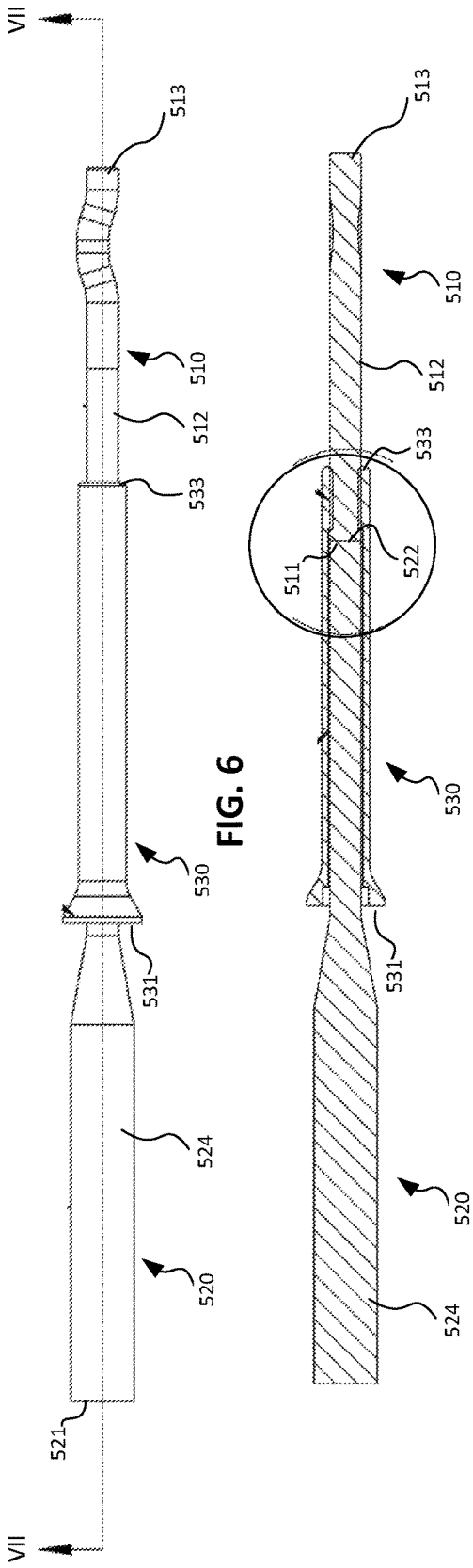

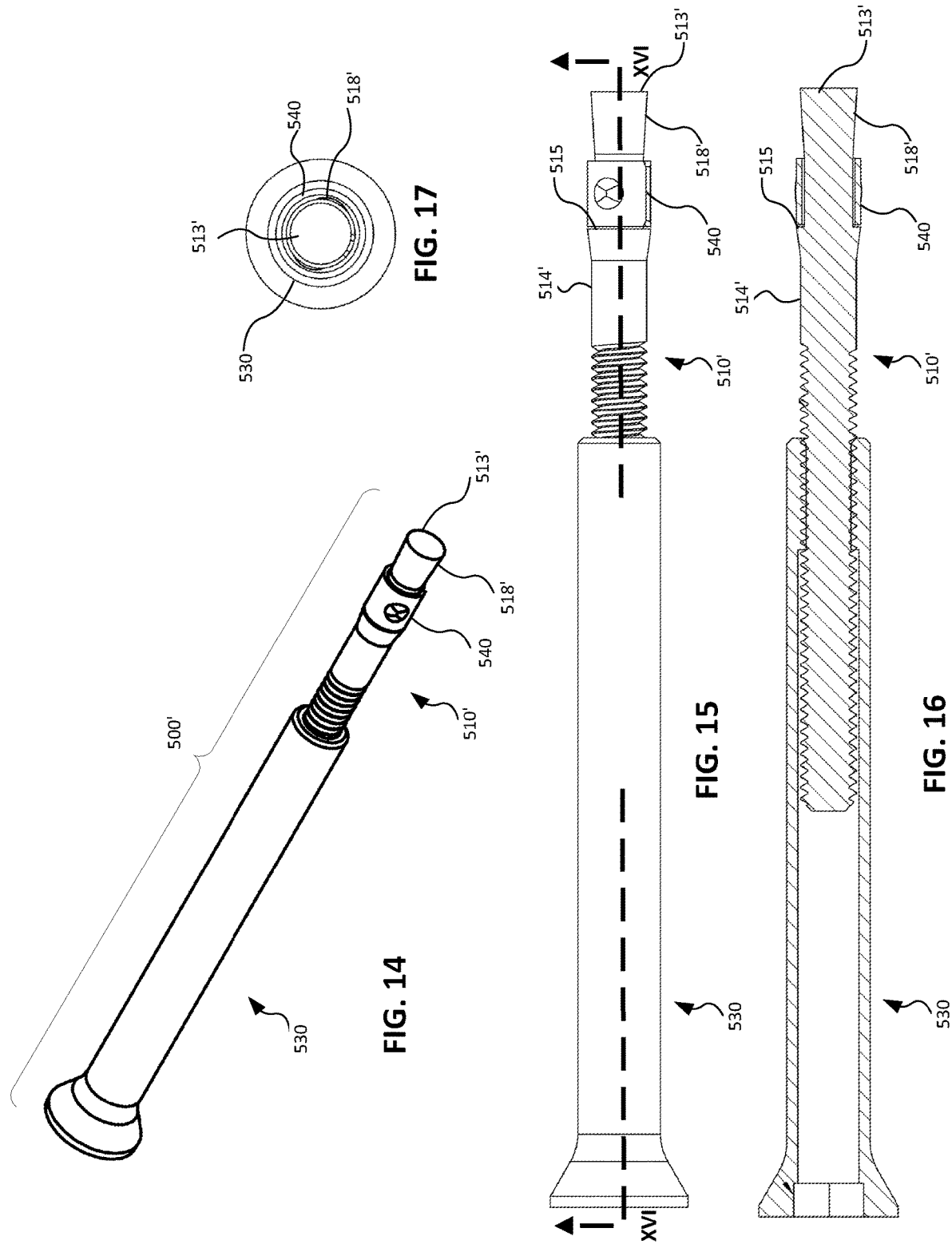

ADJUSTABLE FASTENER SYSTEM

CROSS-REFERENCE TO RELATED APPLICATIONS

This application claims the benefit of U.S. Provisional Patent Application Ser. No. 62/774,773, filed on Dec. 3, 2018, which is fully incorporated herein by reference.

TECHNICAL FIELD

The present disclosure relates to fasteners and more particularly, to an adjustable fastener system for use in construction applications, such as fastening insulation to concrete roof structures.

BACKGROUND INFORMATION

In various construction applications, it may be desirable to use a fastener capable of being adjusted to different heights. When installing insulation panels on a concrete roof, for example, the thickness of the insulation panels may vary. As a result, conventional fasteners with a wide variety of different lengths must be obtained and stocked for these applications. Although some adjustable fasteners exist, they are often not suitable for certain applications such as installing insulation panels to concrete.

BRIEF DESCRIPTION OF THE DRAWINGS

These and other features and advantages will be better understood by reading the following detailed description, taken together with the drawings wherein:

FIG. 5 is a perspective view of an adjustable fastener system including an anchor component, a drive component, and a finish head component, consistent with another embodiment of the present disclosure.

FIG. 6 is a side view of the adjustable fastener system shown in FIG. 5.

FIG. 7 is a cross-sectional view of the adjustable fastener system taken along line VII-VII in FIG. 5.

FIG. 8 is an enlarged cross-sectional view of the engagement of the drive component and anchor component in the adjustable fastener system shown in FIG. 5.

FIG. 14 is a perspective view of the adjustable fastener system shown in FIG. 5 including another embodiment of the anchor component with an anchor sleeve.

FIG. 15 is a side view of the adjustable fastener system shown in FIG. 14.

FIG. 16 is a cross-sectional view of the adjustable fastener system taken along line XVI-XVI in FIG. 15.

FIG. 17 is an end view of the adjustable fastener system shown in FIG. 14.

DETAILED DESCRIPTION

An adjustable fastener system, consistent with embodiments of the present disclosure, generally includes an anchor component, a drive component, and a finish head component. The finish head component is threaded onto the anchor component to form the completed fastener that may be adjusted to different heights. The drive component is used to drive the anchor component into position prior to adjusting the finish head component. In some embodiments, the drive component may be used before the finish head component is installed, and in other embodiments, the drive component may be used with the finish head component installed. The adjustable fastener system saves time and effort at a construction site, eliminates the amount of prep work, and eliminates the need to have multiple different fasteners on site. Although exemplary embodiments described herein refer to an application for installing insulation panels over concrete in a roofing system, the adjustable fastener system may be used for other applications, such as hanging pipes.

Figure 1:
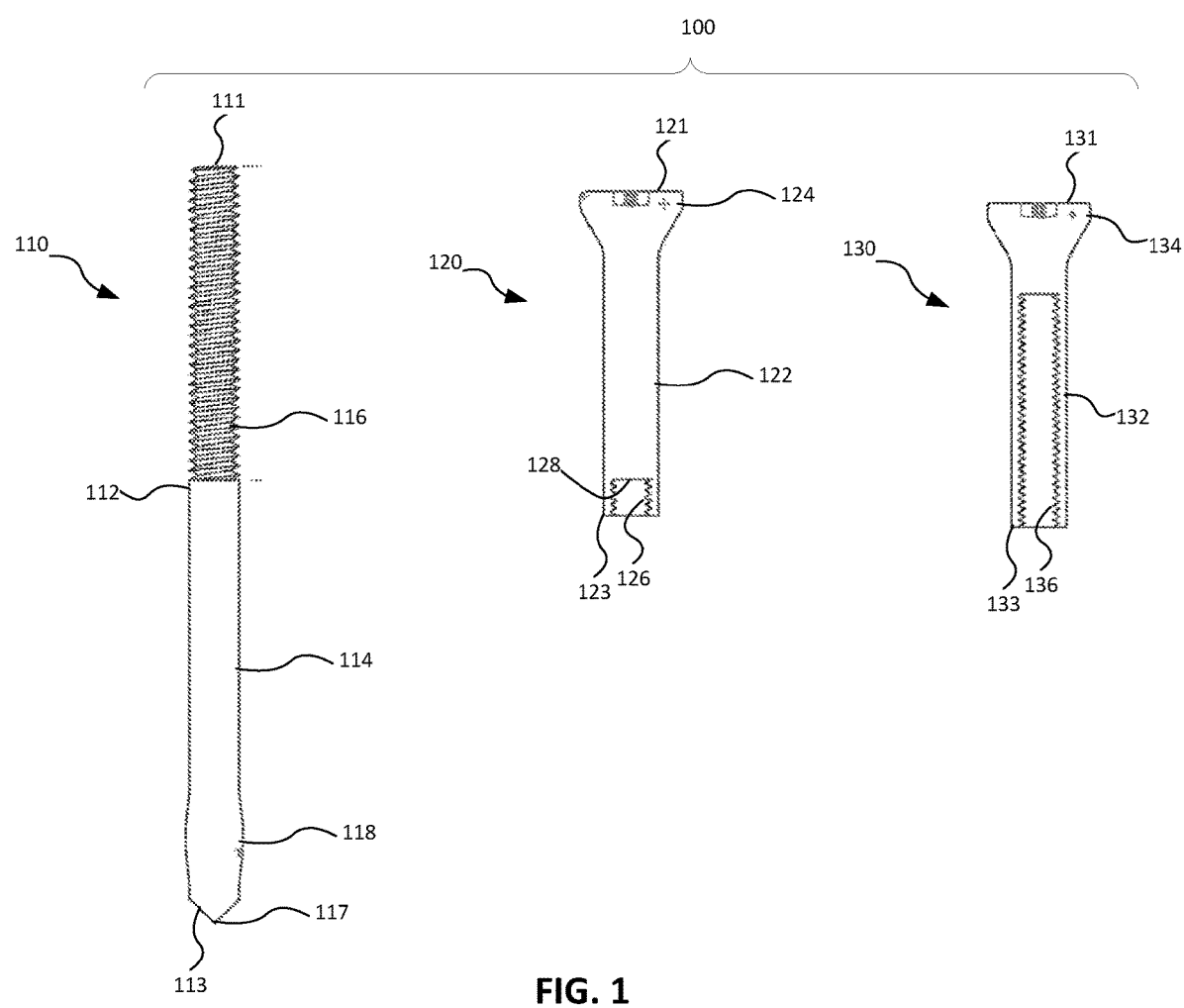
FIG. 1 is a side and partially cross-sectional view of an adjustable fastener system including an anchor component, a drive component, and a finish head component, consistent with one embodiment of the prevent disclosure.
Figures 2, 3, 4:
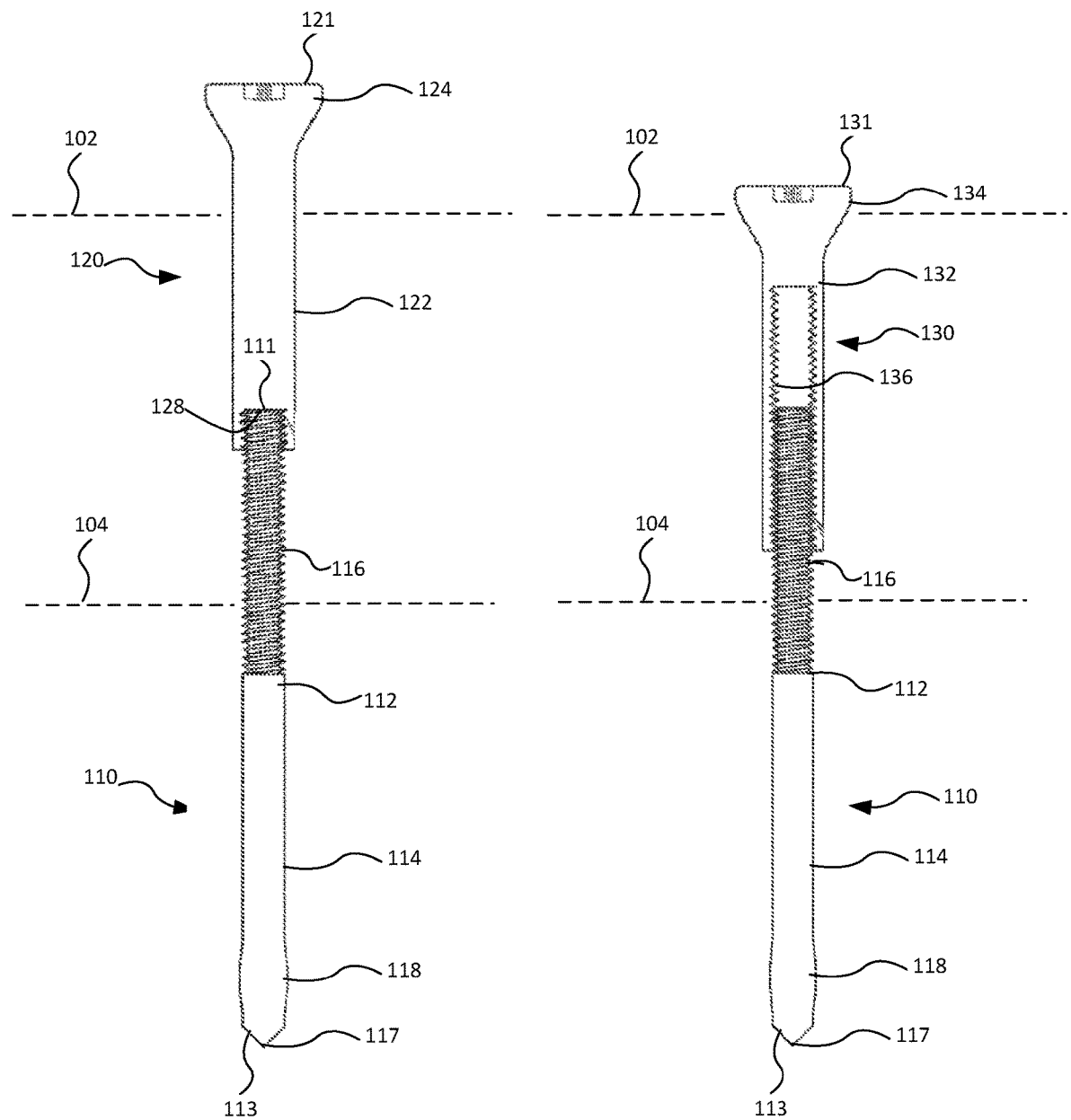
FIG. 2 is a side and partially cross-sectional view of the drive component threaded onto the anchor component shown in FIG. 1 for purposes of installing the anchor component.
FIG. 3 is a side and partially cross-sectional view of the finish head component threaded onto the anchor component shown in FIG. 1 for purposes of completing and adjusting the fastener.
FIG. 4 is a top view of a fastener head of the drive component and the finish head component.

Referring to FIGS. 1-4, an adjustable fastener system 100, consistent with an embodiment of the present disclosure, is shown and described in greater detail. The adjustable fastener system 100 includes an anchor component 110, a finish head component 130, and a drive component 120 that is threaded onto the anchor component 110 to drive the anchor component 110 before the finish head component 130 is installed. FIG. 2 shows the drive component 120 threaded onto the anchor component 110 for purposes of driving the anchor component 110 through a first material 102 to be fastened, such as an insulation panel, and into a second material 104, such as concrete, to which the first material 102 is to be fastened. As shown in FIG. 3, the finish head component 130 is then (i.e., after the drive component 120 is removed) threaded onto the anchor component 110 to the desired height relative to the first material 102 to be fastened. Although first and second materials 102, 104 are shown, the adjustable fastener system may be used to fasten any number of materials, components, structures, and the like in various applications.

In this illustrated embodiment, the anchor component 110 includes a first end 111, a second end 113, and a rigid body 112 between the first end 111 and the second end 113. The rigid body 112 includes an anchor shaft 114 extending to the second end 113, and an outer threaded portion 116 extends along at least a portion of the rigid body 112 proximate the first end 111. Although shown in the illustrated embodiment, the outer threaded portion 116 need not extend to the first end 111. In the illustrated embodiment, the anchor shaft 114 has a sharp tip 117 at the second end 113 to penetrate the material 104, such as concrete, and a wider portion 118 proximate the second end 113 to provide frictional force within the material 104.

In the illustrated embodiment, the drive component 120 includes a first end 121, a second end 123, and a rigid body 122 extending between the first end 121 and the second end 123. A fastener head 124 is located at the first end 121, and the rigid body 122 defines an inner threaded portion 126 proximate the second end 123. The inner threaded portion 126 is configured to threadably engage the outer threaded portion 116 on the anchor component 110, as shown in FIG. 2, for example, by engaging and rotating the fastener head 124. The rigid body 122 also defines an interior drive surface 128 proximate the second end 123, which is configured to engage the first end 111 of the anchor component 110, when threadably engaged (FIG. 2), to apply a drive force for driving the anchor component 110 into the materials 102, 104. The inner threaded portion 126 of the drive component 120 is substantially shorter than the outer threaded portion 116 of the anchor component 110 to allow the interior drive surface 128 to engage the first end 111 when fully threaded onto the anchor component 110.

In the illustrated embodiment, the finish head component 130 includes a first end 131, a second end 133, and a rigid body 132 extending between the first end 131 and the second end 133. A fastener head 134 is located at the first end 131, and the rigid body 132 defines a hollow region and an inner threaded portion 136 extending to the second end 133. The inner threaded portion 136 is configured to threadably engage the outer threaded portion 116 of the anchor component 110 as shown in FIG. 3, for example, by engaging the fastener head 134. In contrast to the drive component 120, the inner threaded portion 136 in the finish head component 130 extends along a substantial portion of the rigid body 132 to allow the finish head component to be adjusted relative to the anchor component within a range of distances (e.g., up to 3 in. for some embodiments).

As shown in FIG. 4, drive component 120 and the finish head component 130 may both include the same type of fastener head 124, 134, thereby requiring only one tool to install both the drive component 120 and the finish head component 130 on the anchor component 110. In the illustrated embodiment, the fastener head 124, 134 is a torx head.

In one example of an adjustable fastener system 100 designed to install an insulation system on concrete, the anchor component 110 is a 3/16" or 1/4" wire, solid shaft made of hard carbon steel with the wider portion 118 about 1/2" from the second end 113 to provide the frictional force to the concrete. The anchor component 110 and finish head component 130 may be coated for corrosion resistance to meet applicable standards such as, for example, the FM Approval Standard 4470 and ETAG 006. The anchor component 110 may include 1 5/8" of standard coarse thread forming the outer threaded portion 116. The finish head component 130 may include a 1 5/8" hollow section with matching standard coarse thread to form the inner threaded portion 136 and allow for the finish head component 130 to be screwed to the top of the anchor component 110. In this example, the finish head component 130 includes a standard, torx-40, bugle head as the fastener head 134. The length of the anchor component 110 and the finish head component 130 may vary depending on the thickness of the installation system being installed.

The adjustable fastener system 100 is less dependent on knowing the exact thickness of the insulation, which is particularly advantageous when installing a tapered insulation system. In this particular application, the concrete may be predrilled with a 7/32" diameter bit while the insulation package is in place. The anchor component 110 with the drive component 120 installed may be inserted through this hole down to the concrete. Once the fastener reaches the concrete, a hammer may be used to set the fastener to the desired depth (e.g., 1"). The drive component 120 may be removed using a torx-40 head bit on a drill prior to installing the finish head component 130 with the same type of bit and drill. If the fastener is sitting proud once the finish head component 120 is started (i.e., higher than the desired height), the installer can then utilize a drill to screw in the finish head component 130 to provide the desired depth. This essentially eliminates the potential of underdriven fasteners and provides a better fit and finish on the final roof system.

In this particular roofing application, the adjustable fastener system 100 saves time and effort on the roof, limits the amount of prep work to install the roofing system, and eliminates having multiple fastener lengths on site. The adjustable fastener system 100 also facilitates mass production by allowing use of the same finish head component 130 and drive component 120 for multiple lengths of fastener. The anchor component 110 may be produced with different lengths, but due to the adjustability, fewer different lengths for the anchor component 110 are needed to cover the same range of fastener lengths. The adjustable fastener system 100 may eliminate as much as two-thirds of the fastener lengths needed using conventional non-adjustable fasteners. Having fewer fasteners reduces the chance of materials being loaded into incorrect containers and reduces the chance for incorrect lengths of fasteners being installed on the roof during installation, thereby providing a labor savings on all sides of the material life cycle.

Referring to FIGS. 5-13, an adjustable fastener system 500, consistent with another embodiment, is shown and described in greater detail. The adjustable fastener system 500 includes an anchor component 510, a finish head component 530, and a drive component 520 that passes through the finish head component 530 to drive the anchor component 510 with the finish head component 530 installed. In this embodiment, the drive component 520 may be a conventional punch tool and thus a drive component designed to thread onto the anchor component 510 is unnecessary. The adjustable fastener system 500 may be used, as described above, to fasten a first material, such as an insulation panel, to a second material, such as concrete.

Figure 9:
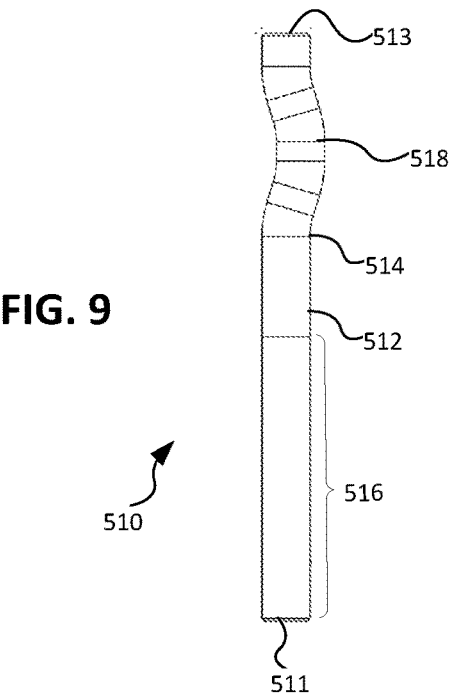
FIG. 9 is a side view of the anchor component of the adjustable fastener system shown in FIG. 5.

As shown in greater detail in FIG. 9, the anchor component 510 includes a first end 511, a second end 513 and a rigid body 512 extending between the first end 511 and the second end 513. The rigid body 512 includes an anchor shaft 514 extending to the second end 513, and an outer threaded portion 516 extends along at least a portion of the rigid body 512 proximate the first end 511. In this embodiment, the anchor shaft 514 includes a deformation or bend 516 proximate the second end 513 to facilitate anchoring the shaft 514.

Figure 10:
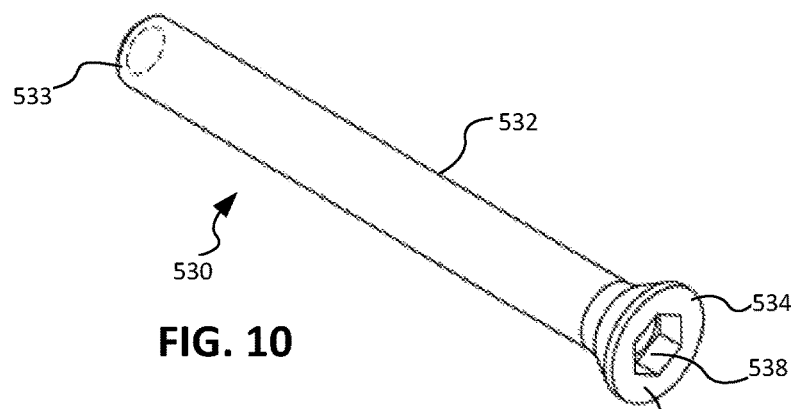
FIG. 10 is a perspective view of the finish head component of the adjustable fastener system shown in FIG. 5.
Figure 11:
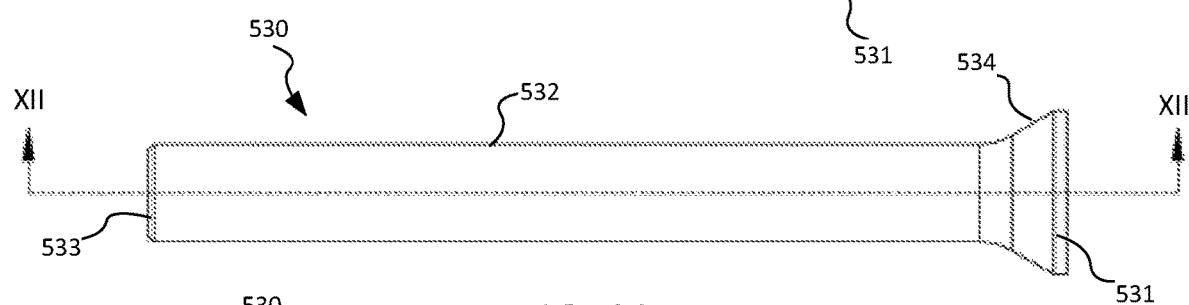
FIG. 11 is a side view of the finish head component shown in FIG. 10.
Figure 12:
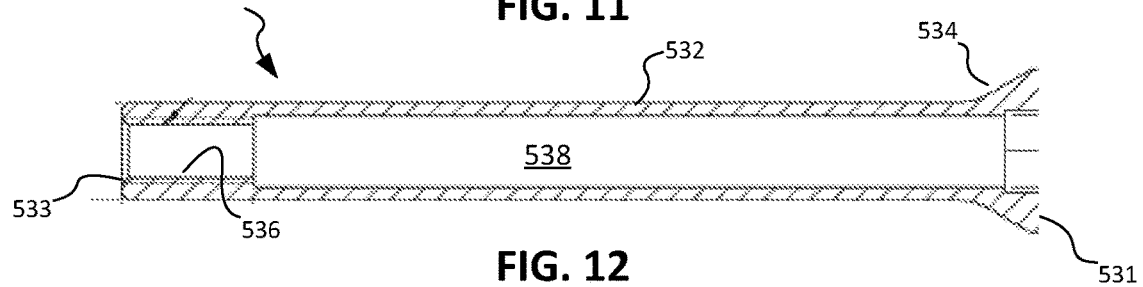
FIG. 12 is a cross-sectional view of the finish head component taken along line XII-XII in FIG. 11.
Figure 13:
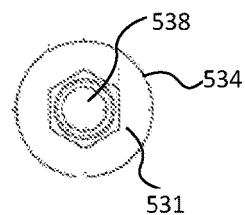
FIG. 13 is a top view of the fastener head on the finish head component shown in FIG. 10.

As shown in greater detail in FIGS. 10-12, the finish head component 530 includes a first end 531, a second end 533 and a rigid body 532 extending between the first end 531 and the second end 533. A fastener head 534 is located at the first end 531 of the finish head component 530, and the rigid body 532 defines an inner threaded portion 536 proximate the second end 533. In this embodiment, the rigid body 532 also defines a passage 538 through the entire finish head component 530 from the first end 531 to the second end 533 to receive the drive component 520. As shown in FIG. 13, the fastener head 534 is a hex head and the passage goes through the fastener head 534.

As shown, the finish head component 530 is threaded onto the anchor component 510 and a punch shaft 522 of the drive component 520 passes through the passage 538 in the finish head component 530. The drive component 520 includes a shank 524 proximate the first end 521 with a wider dimension or diameter than the punch shaft 522. As shown in FIG. 8, the punch shaft 522 contacts the first end 511 of the anchor component 510 above the outer threaded portion 516 to avoid damage to the threads. The drive component 520 may then be used to drive the anchor component 510 with the finish head component 530 in place. The drive component 520 may then be removed and the finish head component 530 may be threadably adjusted relative to the anchor component 510, for example, by engaging the fastener head 534, to adjust to a desired height.

Referring to FIGS. 14-17, a further embodiment of an adjustable fastener system 500', similar to the system 500 shown and described above, includes an anchor component 510' with an anchor sleeve 540 proximate the second end 513'. The anchor sleeve 540 is positioned between a shoulder 515 and a deformed or wider portion 518' on the anchor shaft 514' proximate the second end 513'. The sleeve 540 may have a slot or other expandable configuration such that the sleeve expands when forced over the wider portion 518'.

This embodiment of the adjustable fastener system 500' may be installed similar to the system 500 described above. Using this embodiment, the concrete is predrilled with a bit larger (e.g., 1/32 in. larger) than the diameter of the sleeve 540. The anchor shaft 514' with the sleeve 540 are then inserted into the concrete and the drive component 520 may be used to set the fastener to the desired depth, as described above. In this embodiment, as the finish head component 530 is tightened (e.g., against the insulation), the sleeve 540 is forced over the wider portion 518' and presses against the concrete to provide an anchoring frictional force to the concrete.

The anchor component 110, 510, 510' may also include other types of shafts including, without limitation, a split shaft, crimp shaft, threaded shaft, and expansion shaft. In further embodiments, the adjustable fastener system may be used with epoxy or other adhesives. The finish head component 130, 530 (and drive component 120) may also include other types of fastener heads including, but not limited to, a mushroom head, a hex head, a flat head, a washer head, a pan head, and a bugle head. The anchor components 110, 510, 510' and finish head components 130, 530 may have various dimensions depending on the desired application. In some embodiments, the total length of the adjustable fastener system 100, 500, 500' may be in the range of 3 to 13 inches.

Accordingly, an adjustable fastener system, consistent with embodiments described herein, may advantageously be used in construction applications, such as roofing installation, to install materials having a varying thickness.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An adjustable fastener system comprising:
   an anchor component including a first end, a second end, an anchor shaft extending to the second end of the anchor component, and an outer threaded section with outside threads adjacent the anchor shaft, wherein the second end of the anchor component is configured to penetrate a material such that the anchor component is anchored in the material;
   a finish head component including a first end, a second end, an inner threaded section along at least a portion extending to the second end of the finish head component and a fastener head at the first end of the finish head component, wherein the inner threaded section is configured to receive the outer threaded section of the anchor component to form an adjustable fastener having an adjustable height by changing a distance that the finish head component is threaded onto the anchor component, wherein the finish head component is adjustable relative to the anchor component while the anchor component remains anchored; and
   a drive component configured to apply a force to the anchor component.

2. The adjustable fastener system of claim 1 wherein the drive component includes an inner threaded section proximate the second end of the drive component, an interior drive surface proximate the second end of the drive component, and a fastener head at the first end of the drive component, wherein the inner threaded section is configured to receive the outer threaded section of the anchor component such that the interior drive surface engages the first end of the anchor component to apply the force applied by the drive component to the anchor component.

3. The adjustable fastener system of claim 2 wherein the inner threaded section of the drive component extends to the interior drive surface of the drive component, and wherein the inner threaded section of the drive component is shorter than the outer threaded section of the anchor component.

4. The adjustable fastener system of claim 1 wherein the finish head component defines a passage through the finish head component from the first end to the second end of the finish head component, and wherein the drive component includes a punch shaft configured to pass into the passage such that the drive component engages the first end of the anchor component to apply the force to the anchor component.

5. The adjustable fastener system of claim 4 wherein the drive component includes a punch head having an outer dimension that is greater than a diameter of the punch shaft.

6. The adjustable fastener system of claim 1 wherein the anchor shaft is substantially straight.

7. The adjustable fastener system of claim 1 wherein the anchor shaft includes a bend.

8. The adjustable fastener system of claim 1 wherein the anchor shaft includes a wider portion proximate the second end.

9. The adjustable fastener system of claim 8 further including an anchor sleeve located on the second end of the anchor shaft and configured to expand.

10. The adjustable fastener system of claim 1 further including an anchor sleeve located on the second end of the anchor shaft and configured to expand.

11. The adjustable fastener system of claim 1 wherein the fastener head of the finish head component is a hex head.

12. The adjustable fastener system of claim 1 wherein the fastener head of the finish head component is a torx head.

13. The adjustable fastener system of claim 1 wherein the finish head component allows adjustability up to 3 inches.

14. An adjustable fastener system comprising:
   an anchor component including a first end, a second end, an anchor shaft extending to the second end of the anchor component, and an outer threaded section with outside threads adjacent the anchor shaft, wherein the second end of the anchor component is configured to penetrate a material such that the anchor component is anchored in the material;

a finish head component including a first end, a second end, an inner threaded section along at least a portion extending to the second end of the finish head component and a fastener head at the first end of the finish head component, wherein the inner threaded section is configured to receive the outer threaded section of the anchor component to form an adjustable fastener having an adjustable height by changing a distance that the finish head component is threaded onto the anchor component, wherein the finish head component is adjustable relative to the anchor component while the anchor component remains anchored.

15. The adjustable fastener system of claim 14 wherein the finish head component defines a passage through the finish head component from the first end to the second end of the finish head component, and further comprising a drive component including, a rigid body, a first end and a second end configured to engage the first end of the anchor component to apply a force to the anchor component, wherein the drive component includes a punch shaft configured to pass into the passage such that the second end of the drive component engages the first end of the anchor component to apply the force to the anchor component.

16. The adjustable fastener system of claim 15 wherein the drive component includes a punch head having an outer dimension that is greater than a diameter of the punch shaft.

17. The adjustable fastener system of claim 14 wherein the anchor shaft is substantially straight.

18. The adjustable fastener system of claim 14 wherein the anchor shaft includes a bend.

19. The adjustable fastener system of claim 14 wherein the anchor shaft includes a wider portion proximate the second end.

20. The adjustable fastener system of claim 14 further including an anchor sleeve located on the second end of the anchor shaft and configured to expand without the anchor sleeve being engaged by the finish head component.

* * * * *